C. M. MAISEL.
MEAT NEEDLE.
APPLICATION FILED JUNE 15, 1911.
1,087,026.
Patented Feb. 10, 1914.
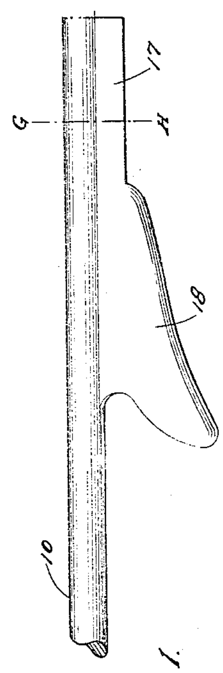
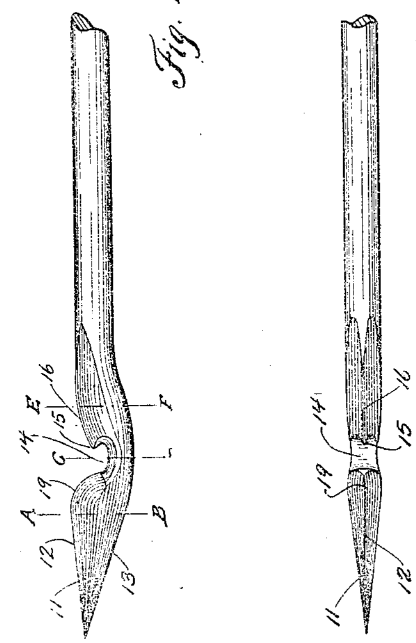
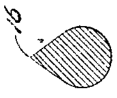
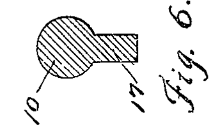
Fig. 4.
11
13
12
Fig. 3.
WITNESSES:
Walter H. Kelley
Bessie E. Dempsey
INVENTOR
Conrad M. Maisel
BY J. W. McElli
ATTORNEY

UNITED STATES PATENT OFFICE.

CONRAD M. MAISEL, OF BUFFALO, NEW YORK.

MEAT-NEEDLE.

1,087,026. Specification of Letters Patent. Patented Feb. 10, 1914.

Application filed June 15, 1911. Serial No. 633,232.

*To all whom it may concern:*

Be it known that I, CONRAD M. MAISEL, a citizen of the United States of America, residing at Buffalo, in the county of Erie and State of New York, have invented certain new and useful Improvements in Meat-Needles, of which the following is a full, clear, and exact description.

In producing my invention I have sought to provide a needle which shall require no latches or other means to hold the cord in place; one which shall fit any size of cord, ordinarily used; and one which, when in use, shall do the work of stringing hams and bacons and binding up roasts with greater ease and speed than is now possible by the present methods.

Reference is to be had to the accompanying drawings, forming part of this specification, in which like characters of reference indicate like parts, throughout the several views, of which:

Figure 1 is a side elevation of my needle. Fig. 2 is a top view of the same. Fig. 3 is an enlarged sectional view of my needle taken on line A—B of Fig. 1. Fig. 4 is an enlarged sectional view of the same taken on line C—D of Fig. 1. Fig. 5 is an enlarged sectional view of the same taken on line E—F of Fig. 1. Fig. 6 is an enlarged sectional view of the same taken on line G—H of Fig. 1.

In the drawings, 10 is the body or shank of my needle; said shank being preferably cylindrical. At the outer end of the shank 10 is the point 11 of my needle, which is preferably diamond shaped and has its upper edge 12 and its lower edge 13 sharpened. 14 is an open eye which is provided directly behind the pointed portion 11. Connecting the front side of the eye 14 with the top edge 12 of the pointed portion 11 is an upwardly and forwardly curved edge 19. The eye 14 is disposed substantially, longitudinally in line with the center of the pointed portion 11 and is formed at its rear side with an inwardly extending hook 15. Starting from the point of the hook 15 and extending backwardly and upwardly and joining the top edge of the shank 10 is a cutting edge 16. The highest point of the edge 12 of the pointed portion 11 is above the shank 10, and the lowest point of the edge 13 of the pointed portion 11 is below the shank 10, thus providing a pointed portion which is vertically wider than the diameter of the shank, so that when the needle is in use there is made in the meat a clearance for the cord which is being used.

The inner end of the shank 10 or tang portion of my needle is preferably provided with an integral feather 17, which fits the stock of my twine holder shown and described in Letters Patent No. 966,758, granted to me Aug. 9, 1910, but obviously this end may be of any other shaped tang if desired.

At a short distance from the inner end of the shank 10 is a cutting knife 18, by means of which the cord which has been used may be quickly and conveniently severed.

When it is desired to use my needle, the cord which is to be threaded is doubled and the loop thus formed is placed in the eye 14 and the cord drawn taut. The needle is now forced into the meat and carries the cord with it. When the cord has been carried through to the desired distance the needle is withdrawn, leaving the cord in place and ready for tying, after which, it may be severed by the knife 18.

Having thus described my invention, what I claim is:

1. As a new article of manufacture, a meat needle, comprising a shank, a diamond-shaped pointed front portion, an open forwardly hooked eye directly behind said front portion, said eye being disposed on a horizontal line with the center of the front portion, a tapered cutting edge immediately behind the hook portion of said eye and a tang portion.

2. As a new article of manufacture, a meat needle, comprising a shank, a diamond-shaped pointed front portion, an open forwardly hooked eye directly behind said front portion, said eye being disposed on a horizontal line with the center of the front portion, an upwardly and forwardly curved cutting edge immediately in front of said hooked eye and a tang portion.

In testimony whereof, I have hereunto set my hand in the presence of two subscribing witnesses.

CONRAD M. MAISEL.

Witnesses:
HENRY STRADTMAN,
J. WM. ELLIS.